(12) United States Patent
Blackmon et al.

(10) Patent No.: US 6,819,630 B1
(45) Date of Patent: Nov. 16, 2004

(54) ITERATIVE DECISION FEEDBACK ADAPTIVE EQUALIZER

(75) Inventors: Fletcher A. Blackmon, Forestdale, MA (US); Mohanadreza M. Hagh, Belmont, MA (US); John Proakis, Andover, MA (US); Masoud Salehi, Westwood, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/666,829

(22) Filed: Sep. 18, 2003

Related U.S. Application Data

(60) Provisional application No. 60/412,432, filed on Sep. 20, 2002.

(51) Int. Cl.[7] .............................................. H04B 11/00
(52) U.S. Cl. ....................................... 367/134; 375/233
(58) Field of Search .......................... 367/134; 375/218, 375/341, 233, 240.07; 340/850

(56) References Cited

U.S. PATENT DOCUMENTS

| | | | | |
|---|---|---|---|---|
| 5,301,167 A | * | 4/1994 | Proakis et al. | 367/134 |
| 5,559,757 A | * | 9/1996 | Catipovic et al. | 367/134 |
| 5,844,951 A | * | 12/1998 | Proakis et al. | 375/233 |
| 6,295,312 B1 | * | 9/2001 | Jarvis | 367/134 |

* cited by examiner

*Primary Examiner*—Ian J. Lobo
(74) *Attorney, Agent, or Firm*—James M. Kasischke; Michael F. Oglo; Jean-Paul A. Nasser

(57) ABSTRACT

The present invention provides a receiver for underwater acoustic telemetry which combines a decision feedback adaptive equalizer structure with a modified turbo-equalizer structure. The modified turbo-equalizer structure is of significantly reduced complexity because the decision feedback adaptive equalizer structure is operable to process a plurality of data channels to provide a single symbol data output stream for application to the input of the modified turbo-equalizer which uses a decision feedback equalized, interleaver, deinterleaver and a decoder. Either a hard viterbi decoder for single iteration processing or a soft in/soft out decoder such as a MAP decoder for multiple iteration can be used. The iteration provide improved performance compared to a normal DFE and lower complexity compared to the traditional turbo-equalizer.

20 Claims, 4 Drawing Sheets

ITERATIVE DECISION FEEDBACK ADAPTIVE EQUALIZER

This application claims the benefit of United States Provisional Application No. 60/412,432, filed 20 Sep. 2002.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to communications systems and, more particularly, to a high performance iterative and adaptive decision feedback equalizer which is especially suitable for use in underwater telemetry.

(2) Description of the Prior Art

The underwater environment provides numerous difficult obstacles for acoustic communications. The ocean acoustic channel produces large amplitude and phase fluctuations on acoustic signals transmitted therethrough causing temporal, spatial, and frequency dependent fluctuations. Multipath distortion is a significant problem. Underwater regions often experience high and/or variable sound attenuation. Ambient ocean noise influences the received signal-to-noise ratio and may require high transmission power levels to achieve suitable ratios depending on the conditions.

Presently utilized underwater coherent acoustic telemetry systems are often able to transmit M-ary Phase Shift Keying (MPSK) and M-ary Quadrature Amplitude Modulation (MQAM) signals. At the receiver end, these coherent signals may be processed by an adaptive multi-channel decision feedback equalizer (DFE). The DFE is then usually followed by a de-interleaver and an error correction decoder operating in a single pass fashion. The de-interleaver randomizes the errors and the error correction decoder tries to correct these randomly distributed errors. The error correction decoder is usually a Viterbi decoder for a convolutional code. The overall performance obtained by this type of prior art underwater telemetry system is often acceptable, but is not satisfactory in many situations. The desire for performance improvement has led to higher performance algorithms whose complexity is orders of magnitude greater than the standard decision feedback equalizer (DFE) system followed by de-interleaving and decoding. The turbo-equalization algorithm is one such algorithm that has performed much better than the normal algorithm but the cost has been extremely high complexity.

Turbo equalization and turbo coding may be applied to many detection and decoding problems. Turbo coding involves concatenation of simple component codes with an interleaver so that decoding can be performed in steps using algorithms of manageable complexity. However, the complexity of prior art turbo equalization increases exponentially with the number of channels and/or other factors, thereby making a multichannel telemetry system, as is typically utilized in underwater telemetry systems, highly complex. More particularly, the complexity of the prior art turbo-equalizer grows with channel complexity, modulation level, and spatial and/or time diversity. The complexity of a prior art turbo-equalizer is therefore orders of magnitude greater than the typical DFE structure discussed above.

The following U.S. Patents describe various prior art systems that may be related to the above and/or other telemetry systems:

U.S. Pat. No. 5,301,167, issued Apr. 5, 1994, to Proakis et al., discloses an underwater acoustic communications system that utilizes phase coherent modulation and demodulation in which high data rates are achieved through the use of rapid Doppler removal, a specialized sample timing control technique and decision feedback equalization including feedforward and feedback equalizers. The combined use of these techniques dramatically increases data rates by one and sometimes two orders of magnitude over traditional FSK systems by successfully combating fading and multi-path problems associated with a rapidly changing underwater acoustic channel that produce intersymbol interference and makes timing optimization for the sampling of incoming data impossible.

U.S. Pat. No. 5,559,757, issued Sep. 24, 1996, to Cati-povic et al., discloses an underwater acoustic telemetry system that uses spatially distributed receivers with aperture sizes from 0.35 to 20 m. Output from each receiver is assigned a quality measure based on the estimated error rate, and the data, weighted by the quality measure, is combined and decoded. The quality measure is derived from a Viterbi error-correction decoder operating on each receiver. The quality estimator exploits the signal and noise differential travel times to individual sensors. The spatial coherence structure of the shallow-water acoustic channel shows relatively low signal coherence at separations as short as 0.35 m. Increasing receiver spacing beyond 5 m offers additional benefits in the presence of impulsive noise and larger scale inhomogeneities in the acoustic field. Diversity combining, even with only two receivers, can lower uncoded error rates by up to several orders of magnitude while providing immunity to transducer jamming or failure.

U.S. Pat. No. 6,295,312 B1, issued Sep. 25, 2001, to Susan M. Jarvis, discloses a method and system for communicating in a time-varying medium. A transmitter sends transmissions of the same message data separated in time with respect to one another. A single sensor receives the transmissions. Each received transmission is buffered until all of the transmissions that were sent are received. The buffered transmissions are simultaneously processed via multichannel adaptive equalization only when all of the transmissions that were sent are received.

The above cited prior art does not disclose a system whose complexity is similar to that of the prior art decision feedback equalizer followed by a de-interleaver and an error correction decoder, but whose performance is greatly improved. The above cited prior art also does not disclose decision feedback equalizers utilizing hard and/or soft feedback from the decoder. The solutions to the above described and/or related problems have been long sought without success. Consequently, those skilled in the art will appreciate the present invention that addresses the above and other problems.

SUMMARY OF THE INVENTION

It is a general purpose of the present invention to provide an improved telemetry system.

Yet another object is to provide an augmented high performance iterative receiver algorithm for underwater acoustic telemetry.

It is another object of the present invention to provide a hard-iterative DFE structure and a soft-iterative DFE structure that is superior to the standard DFE structure.

It is yet another object of the present invention to provide a system which has linear complexity growth with the size of the symboling constellation as opposed to more complex systems such as turbo-equalization which experience exponential complexity growth.

An advantage of the present invention is that it takes advantage of the attractive features of the DFE structure such as diversity combining, modest complexity increase with channel complexity, symbol synchronization, and phase tracking while providing higher performance than a standard DFE with less complexity than the turbo-equalizer.

A feature of one embodiment of the invention combines a decision feedback adaptive equalizer (DFE) with a turbo-equalizer whereby the decision feedback equalizer or variant thereof provides a pre-processing stage for a turbo-equalizer that significantly limits the complexity of the turbo-equalizer.

An advantage of the present invention is superior performance as compared to the standard DFE structure.

Another advantage is that time or spatial signal diversity can be processed with low complexity within the DFE to provide a single stream of diversity combined symbols which can be processed with a simplified turbo-equalizer construction for use in multichannel transmissions.

Yet another advantage of the present invention is that a DFE structure may be utilized therein to take advantage of fractional spacing to help synchronize symbols.

Yet another advantage of the present invention is that a DFE structure may be utilized to reduce the extent of the channel response and therefore allow a turbo-equalizer to operate on a much shorter impulse response in order to reduce the complexity thereof.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages. Accordingly, the present receiver is operable for use in a telemetry system such as an underwater telemetry system and may comprise one or more elements such as, for instance, at least one data input channel connected to the receiver, and a decision feedback equalizer for receiving the data input channel. The present receiver preferably produces an estimated symbol sequence output during a plurality of iterations of operation. The present receiver may further comprise a symbol-by-symbol detector which is preferably operable for receiving the estimated symbol sequence output and operable to produce a symbol-by-symbol detector output. A decoder is provided for receiving the estimated symbol sequence output and for producing a decoded output. An iterative feedback connection is provided between the decoder and the decision feedback equalizer to provide feedback from the decoder for use in at least some of the plurality of iterations of operation of the decision feedback equalizer. In a preferred embodiment, the decoder may be a Viterbi decoder or a MAP decoder.

The receiver further may comprise a feedback filter for the decision feedback equalizer and in one embodiment may comprise a switch between the symbol-by-symbol detector and the feedback filter and the iterative feedback connection operable for selectively connecting the symbol-by-symbol detector output to the feedback filter or for connecting the iterative feedback connection to the feedback filter. In this embodiment, the switch is operable for connecting the symbol-by-symbol detector output to the feedback filter during a first iteration of the plurality of iterations and then connecting the iterative feedback connection to the feedback filter for subsequent of the plurality of iterations, at least until a stop criterion is reached.

The receiver may further comprise a feedback filter wherein the feedback filter is operable for receiving hard values of decoded symbols from the decoder by means of the iterative feedback connection.

In another embodiment the iterative feedback connection between the decoder and the decision feedback equalizer may connect to the symbol-by-symbol detector. The iterative feedback connection provides log likelihood ratio information and the symbol-by-symbol detector may further comprise a converter for converting estimated symbol sequence output from said decision feedback equalizer to log likelihood ratio information. A combiner may be utilized to combine the log likelihood ratio information from the iterative feedback connection and the log likelihood ratio information produced by the converter. The symbol-by-symbol detector further comprises a decision module for receiving the combiner output and producing hard values of decoded symbols for the feedback filter.

A method of operation is provided which may comprise one or more steps such as, for instance, iteratively processing a received signal with a decision feedback equalizer to produce estimated symbol sequence information and post-processing the estimated symbol sequence information with a decoder wherein the decoder may comprise at least a Viterbi decoder or a MAP decoder. Other steps may comprise providing a feedback connection between the decoder and the decision feedback equalizer to provide feedback information from the decoder for use in at least some plurality of iterations of the processing by the decision feedback equalizer.

The method may further comprise selectively utilizing the feedback information from the decoder so that after a first iteration of processing by the decision feedback equalizer, then the feedback information is utilized in subsequent of the plurality of iterations of the processing, at least until a stop criterion is reached.

In one possible embodiment, the method may comprise controlling a switch for connecting the feedback connection to the feedback filter in the decision feedback equalizer.

In another possible embodiment, the method may comprise combining the estimated symbol sequence information with log likelihood ratio information produced utilizing the decoder. The method may comprise processing the estimated symbol sequence information prior to the step of combining by converting the estimated symbol sequence information to log likelihood ratio information. The step of converting may further comprise multiplying the estimated symbol sequence by a factor wherein the factor comprises computing a variance of the estimated symbol sequence.

The method may comprise iteratively processing BPSK modulated signals or may comprise iteratively processing MPSK and MQAM modulated signals and/or may be utilized for other types of modulated signals, as desired.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing, wherein like reference numerals refer to like parts and wherein.

DESCRIPTION OF THE PREFERRED EMBODIMENT

The present invention provides an augmented high performance iterative receiver algorithm for underwater acoustic telemetry. The present invention provides an improved performance iterative decision feedback equalizer (DFE) which may utilize either hard feedback or soft feedback while maintaining reasonable modest complexity. The complexity of the algorithm is of the same order of complexity as the standard algorithm.

Figure 1:
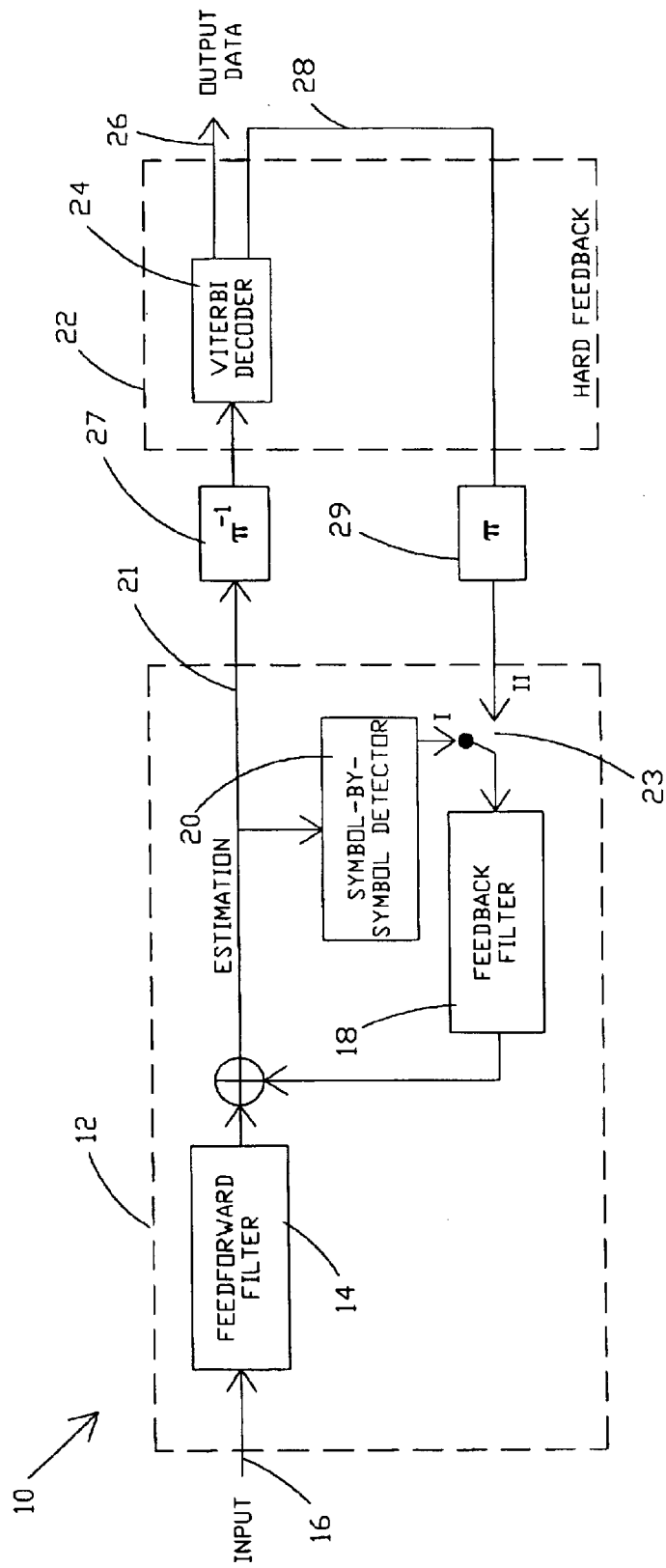
FIG. 1 is a block diagram schematic of a presently preferred iterative decision feedback equalizer with hard feedback in accord with the present invention.
Figure 2:
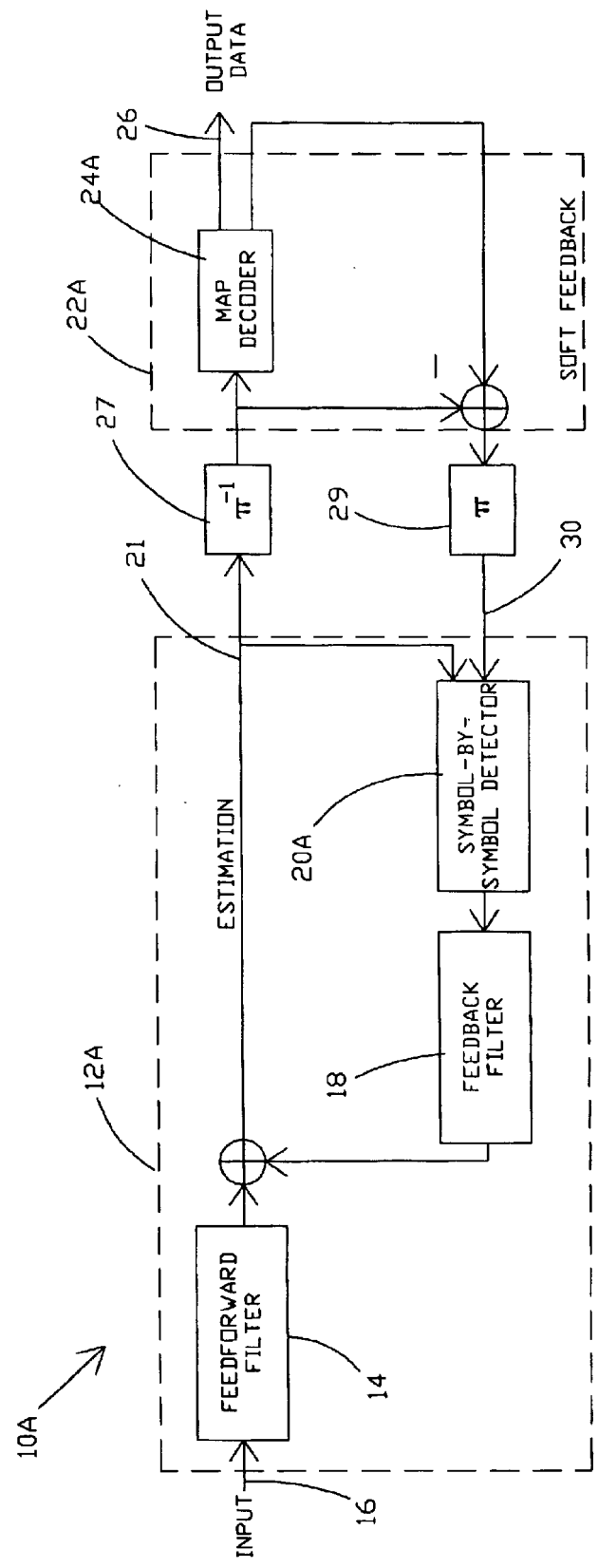
FIG. 2 is a block diagram schematic of a presently preferred iterative decision feedback equalizer with soft feedback in accord with the present invention.

Referring now to the drawings, and more particularly to FIG. 1, there is shown a presently preferred embodiment of an iterative Decision Feedback Equalizer (DFE) system 10 with hard feedback structure. In FIG. 2, there is shown the general structure of a presently preferred embodiment of an iterative DFE system 10A with soft feedback structure. Both of these iterative DFE systems 10 and 10A comprise a Decision Feedback Equalizer 12 and 12A, respectively, and a decoder section 22 and 22A, respectively.

In FIG. 1, DFE 12 comprises feed-forward transversal filter 14 to which a signal 16, such as multichannel signals with numerous inputs for receipt by matched filters, may be initially received. Thus, it will be understood that feed-forward transversal filter 14 may comprise a plurality of transversal filters or tapped delay line filters as per the prior art. Transversal filter 14 provides an equalizer structure which is followed by feedback transferal filter section 18 and symbol-by-symbol decoder 20 which acts as the de-interleaver. Feedback transversal filter 18 is preferably utilized to implement a feedback finite impulse response (FIR) filter in DFE 12. Thus, feedback transversal filter 18 is also conveniently referred to as feedback FIR filter 18 herein. An estimated symbol sequence at line 21 is de-interleaved by de-interleaver 27 then applied to decoder section 22 which preferably comprises a soft-decision Viterbi decoder 24 or other suitable decoder. Output from DFE with hard feedback structure 10 is output line 26 from soft-decision Viterbi decoder 24. In high signal to noise ratios, the hard decoded symbols from soft-decision Viterbi decoder 24 are more reliable than the previously detected symbols by DFE 12. In the hard-feedback embodiment of the present invention, hard values of decoded symbols of the soft decision Viterbi algorithm output from line 28 are interleaved using interleaver 29 and are iteratively used as feedback to feedback transversal filter 18, which is used to implement a feedback finite impulse response (FIR) filter in DFE 12. In a DFE with hard feedback structure 10, the first iteration has the same functionality as does the prior art non-iterative structure which was discussed hereinbefore. After removing intersymbol interference (ISI) from the received signal at input 16 to produce the estimated symbol sequence at 21 by means of the de-interleaver comprised of symbol-by-symbol detector 20 and feedback transversal filter or feedback FIR filter 18, the resulting sequence can be decoded by the Viterbi decoder 24. Thus, at this first iteration, there is no difference between this system and the prior art non-iterative DFE discussed hereinbefore. However, in the subsequent iterations, DFE 12 receives the hard outputs of the decoder section 22 at feedback FIR filter 18, which may be selectively effected utilizing switch 23, whereby the accuracy of output data at output 26 is improved, at least for the case of relatively high signal to noise ratios. Therefore, in one embodiment of the invention, switch 23 is effective for changing the feedback to feedback FIR filter 18 for use of the hard values of the encoded signals from the decoder section 22 after the first iteration and so long as desired.

Thus, system 10 is especially useful for the case of certain signal-to-noise ratios (SNRs). However, simulation results at least for a standard DFE 12 with interleaver and decoder 24 operating in an iterative DFE fashion with hard feedback as per system 10 showed that for very low signal-to-noise ratios, the performance of system 10 is not satisfactory. This is because at very low SNRs, the Viterbi decoder 24 algorithm generates burst errors. Due to the subsequent error propagation of DFE 12, these errors will generate more errors in the next iterations.

Analyzing system 10, when we utilize the decoded values from line 28 for the coded symbols in the feedback FIR filter 12, we lose some information about the detected symbols provided by the estimated symbol sequence at line 21 from DFE 12 itself.

An improved approach, especially for low SNRs, is shown in the embodiment of iterative decision feedback adaptive equalizer system 10A shown in FIG. 2. In the approach of system 10A, all the information including the soft values of the coded symbols out of decoder section 22A and the soft information about the detected symbols provided by the DFE 12A at line 21 in its decision directed mode of operation. This combined information is then used to make a symbol decision in the symbol-by-symbol detector 20A.

For system 10A, the way in which we combine the two information streams is of importance. These two information streams are of different kinds, the soft feedback information from the decoder 24A is of log likelihood ratio (LLR) type, but the estimated symbol sequence $\{\hat{I}_k\}$ at line 21 is DFE 12A estimator output.

Let us assume DFE 12A is doing perfect channel equalization at each symbol iteration and let us further assume that it can remove all the inter-symbol interference (ISI) from the $\{\hat{I}_k\}$ sequence. Therefore, we can calculate the LLR value for $\{\hat{I}_k\}$ and since we are assuming the entire ISI has been removed by the equalizer, the estimated signal has a normal pdf with an unknown variance. Hence:

$$L(\hat{I}) = \ln \frac{p(c_k = +1 \mid \hat{I})}{p(c_k = -1 \mid \hat{I})} \qquad (1)$$

$$= \ln \frac{\frac{1}{\sqrt{2\pi}\,\sigma} \exp\left(-\frac{1}{2\sigma^2}|\hat{I} - 1|^2\right)}{\frac{1}{\sqrt{2\pi}\,\sigma} \exp\left(-\frac{1}{2\sigma^2}|\hat{I} + 1|^2\right)} = \frac{2}{\sigma^2} \cdot \hat{I}$$

where $\sigma^2$ is the variance of $\{\hat{I}_k\}$. Now all we have to do is to compute the variance of the estimated sequence $\{\hat{I}_k\}$ and then convert the estimated sequences to LLR by multiplying times the variance log-likelihood ratio (VLLR) estimator 32 determined above of $$\frac{2}{\sigma^2}.$$

Figure 3:
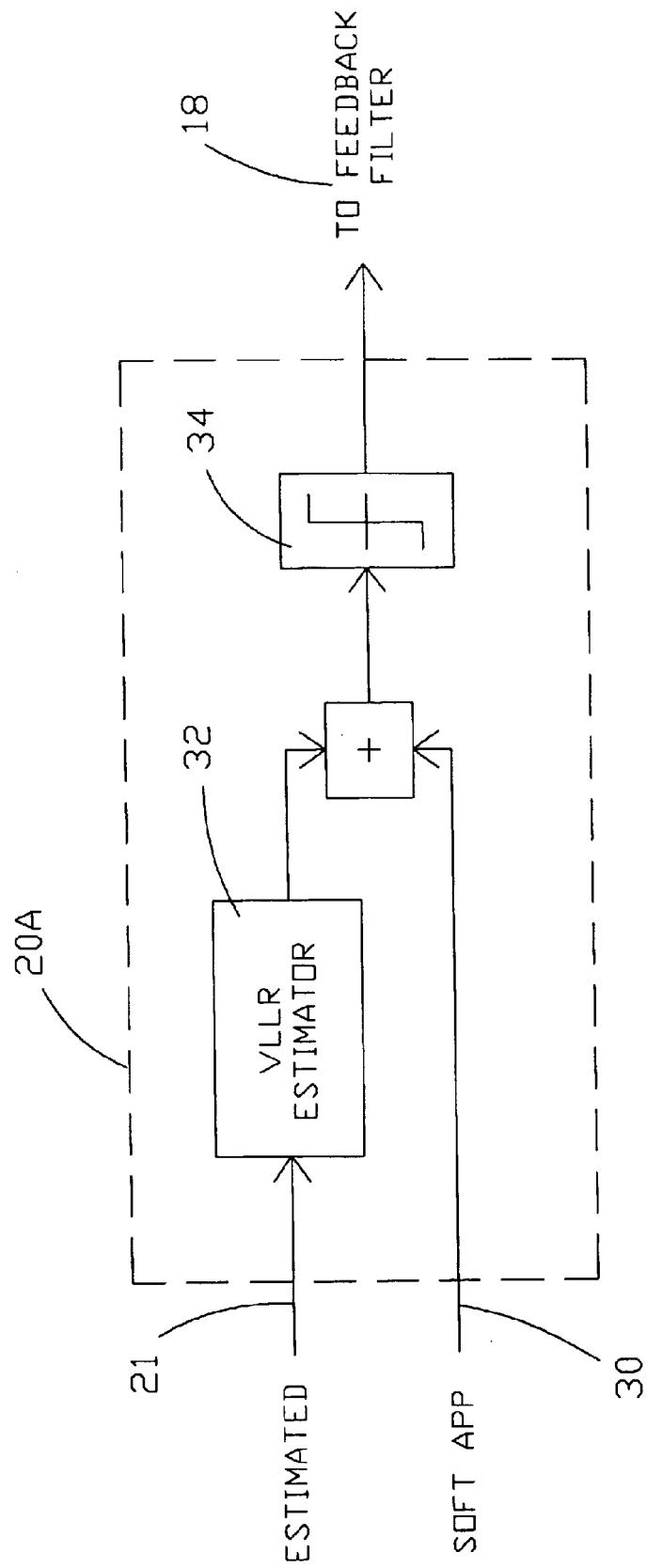
FIG. 3 is a block diagram schematic of a symbol-by-symbol detector unit for an iterative decision feedback equalizer with soft feedback in accord with the present invention.

In the next step, we will use this LLR and other soft valued LLR of the feedback of a posteriori probabilities (APP) from the previous iterations from detector feedback line 30 to make a decision in decision maker 34 of module 20A to provide hard detected signals, one possible embodiment of which is shown in greater detail in FIG. 3.

We can compute the variance of $\{\hat{I}_k\}$ sequence by the following recursive equation:

$$\sigma_k^2 = \frac{(k-1)\cdot\sigma_{k-1}^2 + (|\hat{I}_k|-1)^2}{k} \quad (2)$$

In system 10B, the inputs of feedback FIR filter 18 have been replaced with the output sequence from the above described symbol-by-symbol detector 20A, an embodiment of which is shown in FIG. 3. We can see that this system will have improved performance in low SNRs compared to the standard DFE 12.

System 10A illustrates the general structure for iterative DFE with soft feedback. The structure of system 10A can be applied to any modulation scheme, e.g., MPSK signals. The only part of system, which needs to be modified, is decision device or symbol-by-symbol detector 20A. Unit 20A combines the information of the DFE nonlinear estimator from line 21 and the feedback LLR information from line 30 and then makes hard decision to provide hard detected signals based on the combined information for application to feedback filter 18. Depending on the type of signal utilized, the structure of decision device or symbol-by-symbol detector 20A may is adjusted accordingly.

In regard to use of system 10A for general MPSK signals, we have seen previously that based on the assumption of correctness of all past detected symbols, minimization of the mean squared error (MSE) leads to a linear equation. The performance of a decision feed back equalizer 12 strongly depends on the quality of the previously detected symbols because any error in feedback filter 12 may cause more errors in detection of the next symbols. This is why error propagation in DFE structure may limit the performance of the system. The goal of the iterative DFE is to modify this structure so that by using the output information of the decoder from the previous iteration, we can reduce the error propagation effects. In system 10A, in the first iteration the equalizer has the same functionality as the prior art DFE. After removing the ISI from the received signal and passing through the de-interleaver the resulting sequence can be decoded by the Viterbi algorithm.

When we use the decoded values for coded symbols in feedback FIR 12, we lose part of the information about the detected symbols provided by the DFE itself. The best solution would be to employ all the information and then make a decision in the symbol-by-symbol detector.

As discussed above, the method by which we combine the two different types of information is important. The soft information of the feedback is LLR, but the estimated symbol sequence $\{\hat{I}_k\}$ is DFE estimator outputs.

Similar to what was done for the BPSK case, let us assume that the equalizer is doing perfect channel equalization in any iteration and that it can remove all the ISI from the $\{\hat{X}_k\}$ sequence. Therefore, we can calculate the LL value for $\{\hat{X}_k\}$ and since we are assuming that the ISI has been removed by the equalizer, the residual ISI plus channel noise has a normal density with an unknown variance, and further we are assuming that the in-phase and the quadrature noise and the residual ISI are independent, thus:

$$L(\tilde{I}=S(i))=\ln p(\tilde{I}_k\_S_i|\hat{x}) \quad (3)$$

$$L(\tilde{I}=S(i)) = \ln\frac{1}{2\pi\cdot\sigma_I\sigma_Q}\exp\left(-\frac{1}{2\sigma_I^2}|\hat{x}_I - S_I(i)|^2\right)\cdot \quad (4)$$
$$\exp\left(-\frac{1}{2\sigma_Q^2}|\hat{x}_Q - S_Q(i)|^2\right)$$

where $\sigma_I^2, \sigma_Q^2$ are the variances of real and imaginary part of $\{\hat{X}_k\}$, respectively. S(i): i=0, 1, 2, 3;

$$L(\tilde{I}=S(i)) = \ln\frac{1}{2\pi\cdot\sigma_I\sigma_Q} - \frac{1}{2\sigma_I^2}|\hat{x}_I - S_I(i)|^2 - \quad (5)$$
$$\frac{1}{2\sigma_Q^2}|\hat{x}_Q - S_Q(i)|^2$$

since $$"\ln\frac{1}{2\pi\cdot\sigma_I\sigma_Q}"$$

is a constant it can be ignored. Hence $$L(\tilde{I}=S(i)) = cte - \frac{1}{2\sigma_I^2}(\hat{x}_I^2 + S_I^2(i) - 2\cdot\hat{x}_I\cdot S_I(i)) - \quad (6)$$
$$\frac{1}{2\sigma_Q^2}(\hat{x}_Q^2 + S_Q^2(i) - 2\cdot\hat{x}_Q\cdot S_Q(i))$$

and $$L(\tilde{I}=S(i)) = cte + \frac{1}{\sigma_I^2}\cdot\hat{x}_I\cdot S_I(i) + \frac{1}{\sigma_Q^2}\cdot\hat{x}_Q\cdot S_Q(i) \quad (7)$$

This last equation represents a general technique to calculate the log likelihood value for non-linear estimations in DFE systems for all I-Q modulation types. For this particular case with QPSK modulation, we have:

$$L(\tilde{I}=S(i))|_{i=0,1,2,3} = \pm\frac{\sqrt{2}}{2\sigma_I^2}\cdot\hat{x}_I \pm \frac{\sqrt{2}}{2\sigma_Q^2}\cdot\hat{x}_Q \quad (8)$$

Now all we need to do is to compute the variances of the estimated sequence $\{\hat{X}_k\}$ and then convert these estimated sequences to LL. The variances values for the in-phase and the quad-phase parts can be calculated by recursive equations:

$$\sigma_{Ik}^2 = \frac{(k-1)\cdot\sigma_{Ik-1}^2 + \left(|\hat{x}_{Ik}| - \frac{1}{\sqrt{2}}\right)^2}{k} \quad (9)$$

$$\sigma_{Qk}^2 = \frac{(k-1)\cdot\sigma_{Qk-1}^2 + \left(|\hat{x}_{Qk}| - \frac{1}{\sqrt{2}}\right)^2}{k} \quad (10)$$

Figure 4:
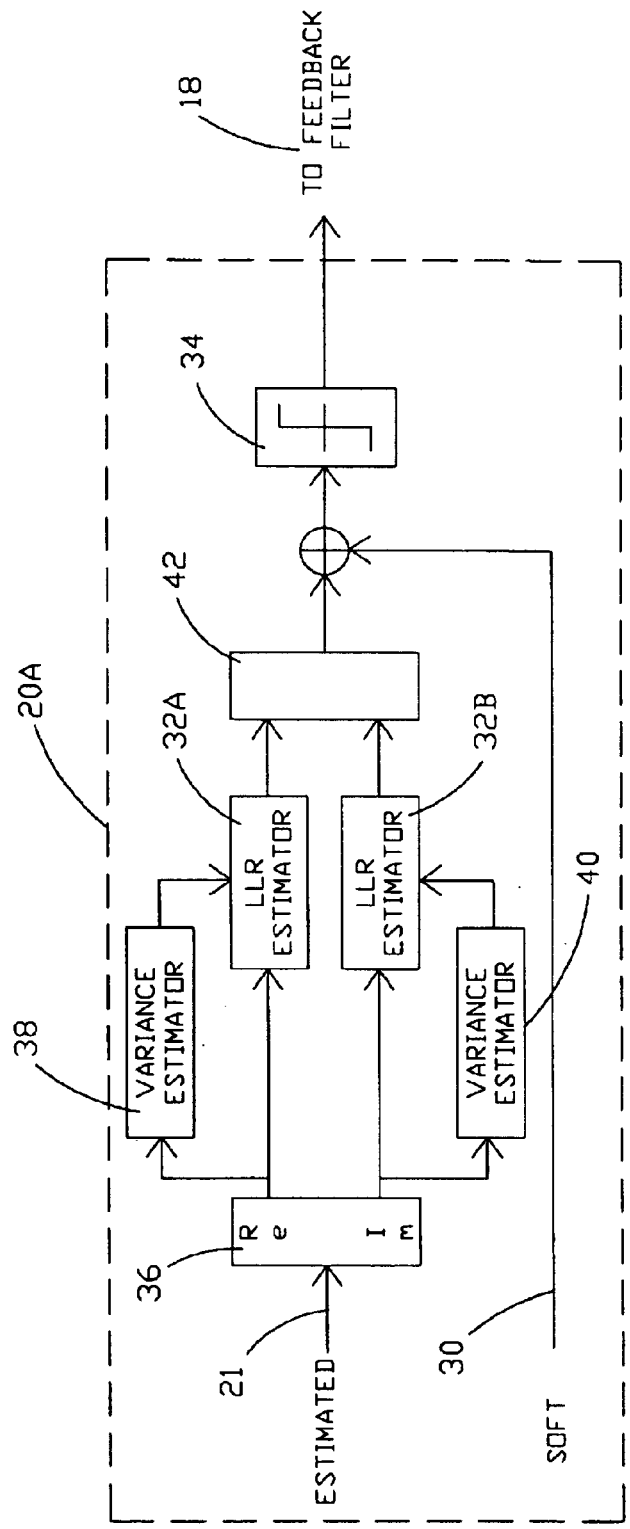
FIG. 4 is a block diagram schematic of an alternative embodiment symbol-by-symbol detector for an iterative decision feedback equalizer with soft feedback for MPSK modulation.

Accordingly, FIG. 4 shows the new structure for the symbol-by-symbol detector unit 20A in an iterative soft DFE system for QPSK modulation. Again estimated sequence from 21 $\{\hat{X}_k\}$ is applied as indicated having real and imaginary parts as shown divided in block 36. Variance estimators 38 and 40 are implemented as per the equations directly above. The signal is then multiplied by the likelihood ratio (LLR) estimator 32A

$$\frac{\sqrt{2}}{2\sigma_Q^2}$$

and 32B

$$\frac{\sqrt{2}}{2\sigma_I^2}$$

as per the equations illustrated above. Real and imaginary parts generated by LLR estimators 32A and 32B are reintegrated in block 42.

In summary, the embodiments shown by the present invention replace the standard DFE structure with an iterative structure that combines the DFE and the decoder block. The hard-iterative DFE system 10 iterates the normal DFE 12 followed by a de-interleaver 27 and decoder 22 which preferably utilizes soft Viterbi decoder 24. In this fashion, the most likely coded or hard encoded symbols of decoder 22 are interleaved at interleaver and passed back to DFE 12 as the new training sequence to be used as the new reference instead of using the decision directed mode of prior art equalizer operation as in the first pass.

The soft-iterative DFE system 10A replaces one preferred embodiment of soft Viterbi decoder 24 with a Maximum A posteriori Probability (MAP) decoder 24A which serves to make better use of the advantages of channel coding to improve the channel equalization-detection process. Embodiment 10A incorporates new information to help make more reliable symbol decisions. MAP decoder 24A is connected to the DFE 12A through an interleaver for the decoded symbols and a de-interleaver for the encoded symbols. After the initial pass through the system, iterations of the soft-iterative DFE system (multiple passes through the system or loops through the system), the decoded reference signal's LLR values from decoder 24A are combined with the decision directed equalizer symbol estimates from line 21 by using variance log-likelihood ratio estimator 32. These combined LLR values are then passed to symbol by symbol detector 20A that determines which symbol of the possible symbols was detected and then feeds back this symbol estimate to feedback filter 18 so that the next sequential symbol can be processed. This iterative processing continues either for a fixed number of iterations has occurred or when a stop criterion based has been passed.

The performance improvement in the hard-iterative scheme is due to using corrected symbols to feedback during subsequent iterations and the performance improvement in the soft-iterative technique is due to using a MAP decoder instead of a Viterbi decoder, iterating the combined equalizer and decoder sections a number of times, combining the decision directed LLR symbol estimates with the decoder's LLR estimates to better determine the symbol to feedback within the equalizer for each symbol in the data packet.

It will be understood that features of the present invention may also be utilized in other types of communication systems than underwater communication systems. Many additional changes in the details, components, steps, algorithms, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A receiver operable for use in a telemetry system, comprising:
    a decision feedback equalizer capable of receiving at least one data input channel, said decision feedback equalizer producing an estimated symbol sequence output during a plurality of iterations of operation of said decision feedback equalizer, said decision feedback equalizer further comprising a symbol-by-symbol detector, said symbol-by-symbol detector being operable for receiving said estimated symbol sequence output and operable to produce a symbol-by-symbol detector output for use as feedback within said decision feedback equalizer;
    a decoder for receiving said estimated symbol sequence output and for producing a decoded output; and
    an iterative feedback connection between said decoder and said decision feedback equalizer to provide feedback from said decoder for use in at least some of said plurality of iterations of operation of said decision feedback equalizer.

2. The receiver of claim 1, wherein said decoder is a Viterbi decoder.

3. The receiver of claim 1, wherein said decoder is a MAP decoder.

4. The receiver of claim 1, further comprising:
    a feedback filter within said decision feedback equalizer; and
    a switch between said symbol-by-symbol detector, said iterative feedback connection and said feedback filter, said switch being operable for selectively connecting said symbol-by-symbol detector output to said feedback filter or for connecting said iterative feedback connection to said feedback filter.

5. The receiver of claim 4, wherein said switch is operable for connecting said symbol-by-symbol detector output to said feedback filter during a first iteration of said plurality of iterations and then connecting said iterative feedback connection to said feedback filter for subsequent of said plurality of iterations at least until a stop criterion is reached.

6. The receiver of claim 1, further comprising a feedback filter wherein said feedback filter is operable for receiving hard values of decoded symbols from said decoder by means of said iterative feedback connection.

7. The receiver of claim 1, wherein said iterative feedback connection between said decoder and said decision feedback equalizer connects to said symbol-by-symbol detector.

8. The receiver of claim 7, wherein said iterative feedback connection provides log likelihood ratio information, and said symbol-by-symbol detector further comprises:
    a converter for converting said estimated symbol sequence output to log likelihood ratio information; and
    a combiner producing a combiner output by combining said log likelihood ratio information from said iterative feedback connection and said log likelihood ratio information from said converter.

9. The receiver of claim 8, wherein said symbol-by-symbol detector further comprises a decision module for receiving said combiner output and producing hard values of decoded symbols.

10. The receiver of claim 9, wherein said decision feedback equalizer further comprises a feedback filter for receiving said hard values of decoded symbols.

11. A method of operation for a receiver, said method comprising:

iteratively processing a received signal with a decision feedback equalizer to produce estimated symbol sequence information;

post-processing said estimated symbol sequence information with a decoder, said decoder comprising at least one of a Viterbi decoder or a MAP decoder;

providing a feedback connection between said decoder and said decision feedback equalizer to provide feedback information from said decoder for use in at least some of a plurality of iterations of said processing by said decision feedback equalizer.

12. The method of claim 11, further comprising selectively utilizing said feedback information from said decoder so that after a first iteration of said processing by said decision feedback equalizer, then said feedback information is utilized in subsequent of said plurality of iterations of said processing at least until a stop criterion is reached.

13. The method of claim 12, further comprising controlling a switch for connecting said feedback connection to a feedback filter of said decision feedback equalizer.

14. The method of claim 11, further comprising combining said estimated symbol sequence information with log likelihood ratio information produced utilizing said decoder.

15. The method of claim 14, further comprising processing said estimated symbol sequence information prior to said step of combining.

16. The method of claim 15, wherein said step of processing further comprises converting said estimated symbol sequence information to log likelihood ratio information.

17. The method of claim 16, wherein said step of converting further comprises multiplying said estimated symbol sequence by a factor.

18. The method of claim 17, wherein said factor comprises computing a variance of said estimated symbol sequence.

19. The method of claim 11, further comprising iteratively processing BPSK modulated signals.

20. The method of claim 11, further comprising iteratively processing MPSK modulated signals.

* * * * *